United States Patent Office 3,275,429
Patented Sept. 27, 1966

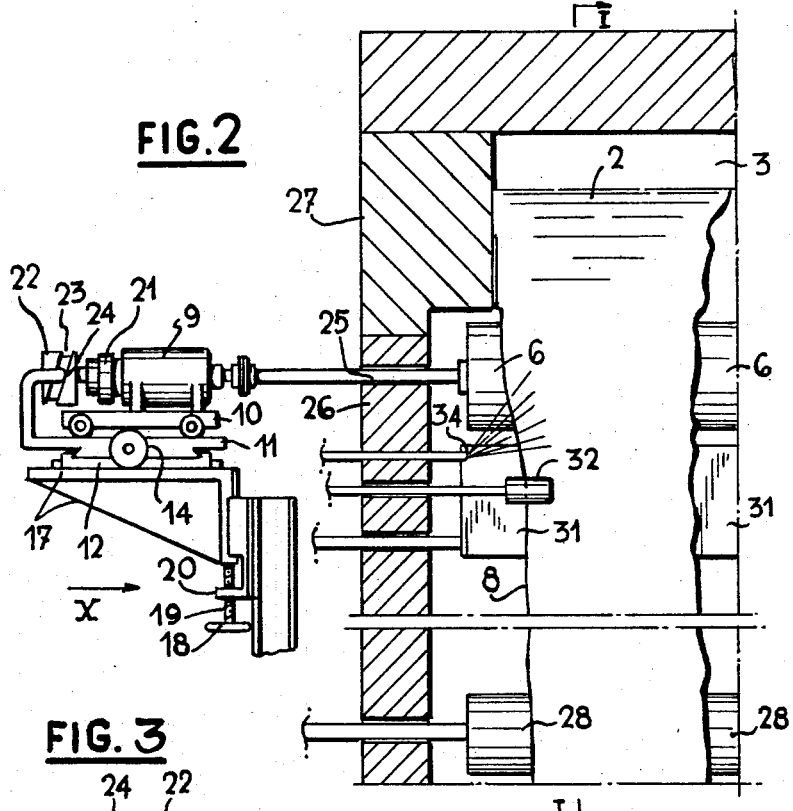
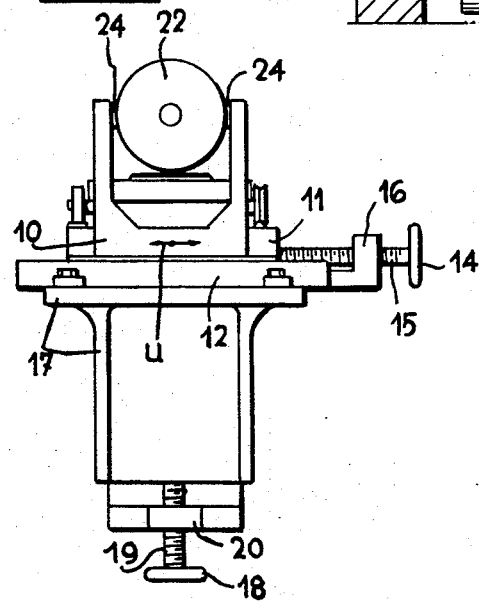

3,275,429
GLASS PROCESSING APPARATUS INCLUDING A RECIPROCATING ROLLER
Gustave Javaux, 6 Rue Simonis, Saint-Gilles, Brussels, Belgium
Filed Sept. 29, 1965, Ser. No. 491,157
1 Claim. (Cl. 65—185)

This application is a continuation-in-part of my earlier filed copending application Serial No. 165,539, filed January 11, 1962 and now abandoned.

This invention relates to an apparatus for down-drawing a sheet of glass from a bulb of viscous glass on the bottom of a horizontal member to which the glass sticks and extending over the whole length of a slot through which the glass flows continuously onto the horizontal member.

It has been proposed to place below a glass-delivering slot a cooled member having in cross-section the shape of a triangle, the base thereof which is disposed in a horizontal plane receiving the layer of glass issuing from the slot. The reason for the presence of this member to which the glass sticks is the insure a uniform thickness of glass over the whole width of the subsequent sheet.

It was assumed that the glass would flow widthwise of the sheet while flowing freely along the inclined surface of the stationary member towards the bottom edge thereof after overflowing in equal quantities along the two longitudinal edges of the base receiving the molten glass in its central zone. However, it has been found in practice that regular production of a sheet of uniform thickness over its whole width is impossible.

It is an object of this invention to obviate this disadvantage. According to the invention, the glass issuing from the slot is received on at least one roller to which the glass sticks and which is rotated at such a speed that some of the viscous glass forming the bulb is moved continuously upwards because of its sticking to the roller, to engage with fresh glass issuing from the slot.

Clearly, if the bulb has unequal thicknesses, the amount of glass displaced upwards is proportional to the thickness, so that the bulb thickness tends to even out. While the glass is rising towards the place where it drops onto the roller, then descending again on the side where it has already descended, it flows parallel to the axis of the rotating roller, another factor which helps to even out bulb thickness. If the layer of glass already sticking to the roller has excessive thickness at the place where the fresh glass drops onto such roller, the layer of fresh glass flowing over the two sides of the rotating roller is less thick at the places where the already partly cooled previous layer of glass has excessive thicknesses, which provides yet another factor helping to even out the total thickness of the bulb.

The plant for carrying the method into effect mainly comprises a rotating roller to which the glass to be drawn sticks and which is rotated at a speed sufficient that, in association with the sticking of the glass to the roller, some of the glass of the bulb can be returned to the top of the roller.

If the layer of glass which has moved from the bulb to the place of introduction of the fresh glass has not reached an even thickness at the time when it reaches the glass-dropping plate, the layer of glass which has passed just beyond this position is not of uniform thickness but can become more uniform before again reaching the bulb.

Specific embodiments of the invention will now be described by way of example with reference to the accompanying drawings in which:

FIGURE 2 is an elevation of one end of the plant shown in FIGURE 1 after sectioning along the broken line II—II of FIGURE 1; and FIGURE 3 is a side elevation of the plant shown in FIGURE 2 looking in the direction of the arrow X of FIGURE 2.

Like references denote like parts throughout the drawings.

Figure 1:
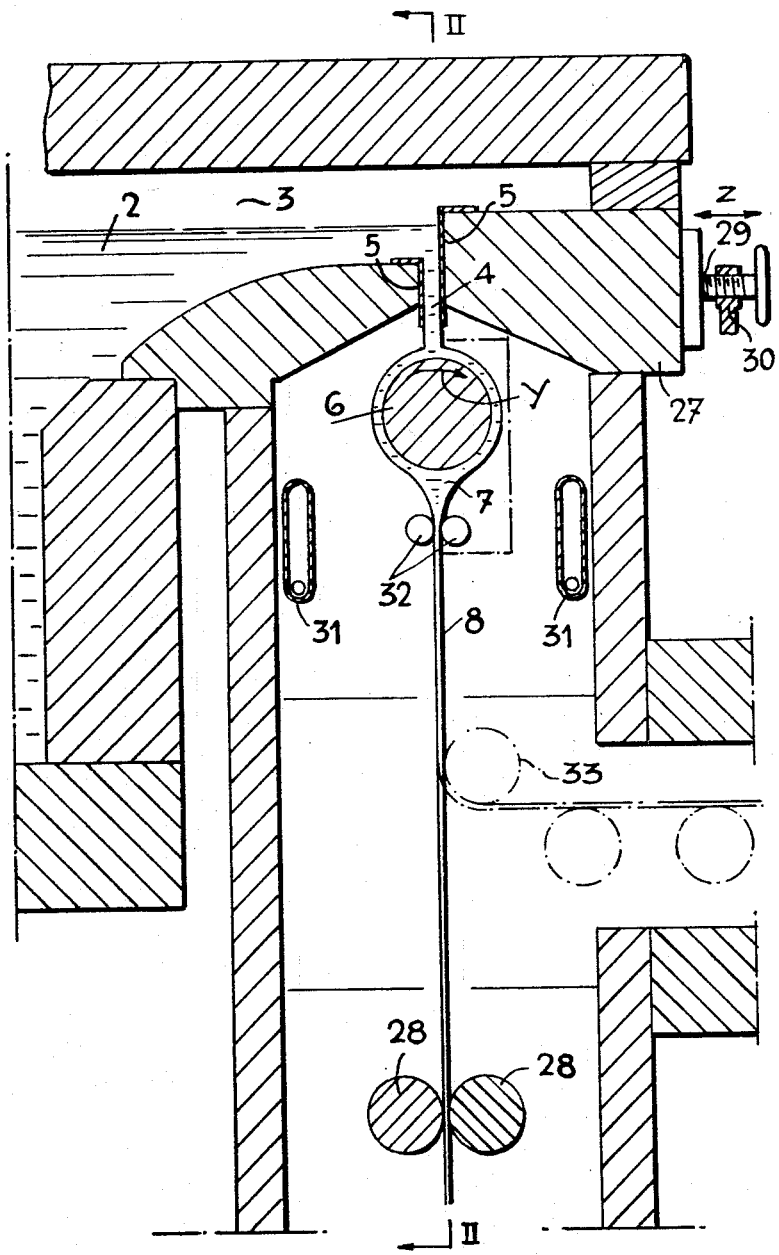
FIGURE 1 is a vertical cross-section through a first embodiment of the drawing plant according to the invention, the section being taken along the line I—I of FIGURE 2.

Referring to FIGURES 1 and 2, there can be seen a plant for down-drawing a sheet of glass wherein glass 2 in a molten state in a vessel 3 flows continuously through a slot 4. The surfaces thereof are covered with foils made of platinum or some other susbtance which can in known manner be electrically heated by Joule's effect to a temperature above the devitrification temperature without damaging the glass. After leaving the platinum sheets 5 the glass spreads over a refractory roller 6 which rotates in a direction indicated by an arrow Y. Because of the nature of the roller 6, the glass sticks thereto and some of it is carried along by the roller 6 to form at the bottom thereof a drawing bulb 7. Another proportion of the glass which is delivered through the slot 4 to the roller 6 spreads over the other part thereof to the bulb 7. This latter flow is opposed by the rotation of the roller 6, to which the glass sticks, in the direction indicated by the arrow Y. The roller rotates at a speed such that some of the viscous glass forming the bulb is moved continuously upwards to engage with fresh glass from the slot 4. The amount of glass moved upwards from each cross-section of the bulb 7 is proportional to the amount of glass contained in such cross-section, so that the bulb width tends to be evened out along the whole length of the bulb. The thickness of the rising glass also tends to even out before returning to the bulb because of the glass flowing parallel with the roller axis.

The thickness of a glass sheet 8 which is down-stream from the bulb 7 by means of drawing rollers 28, can be controled by varying the speed at which the roller 6 rotates and by varying the distance between the same and the bottom edges of the platinum sheets 5. Accordingly, the roller 6 is driven by a variable-speed motor 9 carried by a carriage 10 adapted to be reciprocated parallel to its axis by running on a bearer 11 horizontally guided in a guide or bearer 12 (FIGURES 2 and 3), in a direction perpendicular to the plane of FIGURE 2. This latter movement is diagrammatically denoted by a twin arrow U in FIGURE 3 and can be performed by operation of a handwheel 14 which is rigidly secured to a threaded rod 15 screwed into a nut 16 rigidly secured to the guide or bearer 12. The bearer 12 is carried by a bracket 17, the height of which can be adjusted by means of a handwheel 18 which operates a threaded rod 19 engaged in a stationary nut 20.

Reciprocation of the refractory roller 6 parallel to its axis is achieved through the agency of a speed reducer 21 (FIGURE 2) which is driven by the motor 9 and which operates a cam 22 in the form of an inclined groove 23. Engaging therein are two fingers 24 which are stationary relatively to the bearer or support 11. Consequently, rotation of the inclined groove 23 at a reduced speed leads to slow reciprocation of the cam 22, of the speed reducer 21, of the motor 9 and of the refractory roller 6. Such reciprocation also helps to even out the thickness of the layer of glass over the whole length of the roller.

For heightwise shifting of the roller 6, the duct, as 25, provided in each end wall 26 of the drawing chamber for passage of the shaft which bears the roller 6 must have a height in relation to the required heightwise movement.

In the embodiment shown in FIGURE 1, the width of the slot 4 can be varied by a refractory block 27 which bears one of the platinum sheets 5 being moved horizontally in the direction indicated by a twin arrow Z. Such movement can be controlled in both directions by rotation of a threaded rod 29 engaging in a stationary nut 30.

FIGURES 1 and 2 also show known coolers 31 and knurled wheels 32 which in known manner are operative on the edges of the sheet to oppose shrinkage thereof after the same has left the bulb. The chain-dotted lines in FIGURE 1 show how the sheet which has just been drawn is guided in known manner into a horizontal annealing oven after having been bent around a bending roller 33. Gas burners 34 which heat the bulb ends are shown in FIGURE 2.

The invention can be realized with the types of glass which are suitable for the up-drawing of a sheet of glass. A glass of said type is composed, for example, as follows, the figures given representing percent by weight:

| | Percent |
|---|---|
| $SiO_2$ | 72.40 |
| $Na_2O$ | 14.03 |
| $K_2O$ | 0.07 |
| $CaO$ | 8.24 |
| $MgO$ | 3.87 |
| $Fe_2O_3$ | 0.097 |
| $Al_2O_3$ | 1.09 |
| $TiO_2$ | 0.038 |
| $ZrO_2$ | 0.0017 |
| $SO_3$ | 0.22 |

The density of this kind of glass is 2500 kg. per cu. m. Its viscosity, expressed in the system of c.g.s. units is 3273 poises at 1100° C., 6839 poises at 1050° C., and 16,980 poises at 1000° C.

Said glass drops onto a roller of refactory material having a diameter of 20 cm. Said roller is made of a silicon-aluminous refactory material of the type used in furnaces for the melting of glass, a material that is corrosion-resistant to the molten glass. Said roller has, for example, the following centesimal composition in percent by weight:

| | Percent |
|---|---|
| $SiO_2$ | 70.5 |
| $Al_2O_3$ | 25.00 |
| $Na_2O+K_2O$ | 1.00 |
| $CaO+MgO$ | 0.50 |
| $TiO_2$ | 2.00 |
| $Fe_2O_3$ | 1.00 |

In order to produce a continuous glass sheet with a thickness of 0.2 cm. at a drawing speed of 30,000 cm. per hour (300 m./h.) by the method of down-drawing the glass sheet from the bulb formed at the lower portion of said roller, it is possible to cause said roller having a diameter of 20 cm. to rotate in any of the following manners:

If the temperature of the glass in contact with the roller is 1100° C. on the average, the roller is rotated at a linear speed of 115 meters per hour, which corresponds substantially to an angular speed of 3 revolutions per minute. In this case, the thickness of the layer of glass on the roller is of the order of 3 cm. The layer is a little thicker on the side where the surface of the roller descends than on the opposite side.

If the temperature of the glass in contact with the roller is 1050° C. on the average, the roller may be rotated at the same speed as in the preceding case, but the layer of glass on the roller will now be thicker. The thickness is now of the order of 4 cm. The layer is again slightly thicker on the side where the roller descends than on the opposite side.

If the temperature of the glass in contact with the roller is 1100° C. on the average, as it was in the first place, the roller may also be rotated at a linear speed of 215 meters per hour, which corresponds substantially to 5.7 revolutions per minute. In this case, the thickness of the layer of glass on the roller is also of the order of 4 cm., but the difference between the descending side and the ascending side appears somewhat smaller than in the two preceding cases.

It is also possible to realize the invention with the type of glass which is currently being used for continuously producing a sheet of glass by horizontal drawing. A glass of this type has, for example, the following centesimal composition expressed in percent by weight:

| | Percent |
|---|---|
| $SiO_2$ | 73.7 |
| $Na_2O$ | 12.62 |
| $K_2O$ | 0.12 |
| $CaO$ | 8.02 |
| $MgO$ | 4.08 |
| $Fe_2O_3$ | 0.096 |
| $Al_2O_3$ | 1.14 |
| $TiO_2$ | 0.037 |
| $ZrO_2$ | 0.0014 |
| $SO_3$ | 0.25 |

The density of the glass is 2520 kg. per cu. m. Its viscosity expressed in the c.g.s. system is 5688 poises at 1100° C., 12,600 poises at 1050° C., and 29,513 poises at 1000° C. This glass is thus more viscous than the one mentioned earlier.

With the aid of this glass, it is possible continuously to produce a sheet of glass of the same thickness and at same speed as in the preceding cases by down-drawing of the bulb formed at the lower portion of the same roller, provided the operation is carried out, for example, in the following manner:

If the temperature of the glass in contact with the roller is 1100° C. on the average, the roller is rotated at a linear speed of 150 meters per hour, which corresponds substantially to an angular speed of 4 revolutions per minute. The thickness of the glass layer on the roller is of the order of 4.5 cm. The difference in thickness between the descending portion and the ascending portion thus appears to be similar to the thickness between the same portions in the first case described above.

If the temperature of the same glass in contact with the roller is 1050° C. on the average, and if said roller is caused to rotate at a linear speed of 115 meters per hour (corresponding approximately to 3 revolutions per minute), the thickness of the layer of glass on the roller is of the order of 4 cm., and the difference between the descending portion and the ascending portion is similar to that of the preceding case.

In all these cases, the speed of rotation of the roller is low, but it is sufficient to return a portion of the glass constituting the drawing bulb to the point where the glass drops onto the roller. The flow of the glass layer parallel to the axis of the roller thus makes it easier to obtain a uniform thickness of the glass layer.

The invention is not, of course, limited solely to the embodiments described and illustrated, and many changes can be made to the form, arrangement and constitution of some of the elements used to embody the invention without departing from the scope thereof, as defined by the appended claim.

What is claimed is:

Apparatus for down-drawing a sheet of glass comprising a source of molten glass, means defining a path of downward flow of the molten glass from said source, a horizontal rotating roller disposed under said means to receive the downward flow at the upper portion of said rotating roller, said roller being disposed relative to the said source so that the molten glass adheres to said roller upon contact therewith and forms a downwardly depending and tapering bulb thereon, means for rotating said roller at a speed such that some of the molten glass from the bulb is drawn upwardly by the rotating roller from the bulb to make a complete cycle with the roller and such that the local amounts of glass withdrawn from the bulb are proportional to the local size of the bulb therefore tending to even the bulb, means for axially reciprocating said rotating roller, and means for drawing downwards a sheet of glass from said bulb formed on the lower part of the roller.

References Cited by the Examiner

UNITED STATES PATENTS 1,436,421  11/1922  Whittemore _____ 65—195 X

FOREIGN PATENTS 477,244  12/1937  Great Britain.

DONALL H. SYLVESTER, *Primary Examiner.*

F. W. MIGA, *Assistant Examiner.*